United States Patent [19]

Faires et al.

[11] E Re. 29,013

[45] Reissued Oct. 26, 1976

[54] EASY PACKING DEEP CONTAINER

[75] Inventors: Tony D. Faires, Chattanooga, Tenn.; Larry M. Balkin, Decatur, Ga.

[73] Assignee: Container Corporation of America, Chicago, Ill.

[22] Filed: June 16, 1975

[21] Appl. No.: 586,852

Related U.S. Patent Documents

Reissue of:

[64] Patent No.: 3,771,714
Issued: Nov. 13, 1973
Appl. No.: 242,625
Filed: Apr. 10, 1972

[52] U.S. Cl. ..... 229/37 R; 229/7 R; 206/44 R; 229/16 R

[51] Int. Cl.[2] ..... B65D 5/16; B65D 5/72

[58] Field of Search ..... 229/37 R, 7 R, 16 R; 206/44 R

[56] References Cited

UNITED STATES PATENTS

| | | | |
|---|---|---|---|
| 2,259,041 | 10/1971 | Larkin | 206/44 R |
| 2,407,865 | 9/1946 | Biskamp | 229/17 R |
| 2,407,919 | 9/1946 | Buttery | 229/7 R X |
| 2,648,480 | 8/1953 | Belsinger | 229/7 R |
| 2,933,229 | 4/1960 | Bensel | 229/17 R X |
| 3,567,102 | 3/1971 | Miller | 229/17 R |
| 3,666,176 | 5/1972 | Watts | 229/37 R |
| 3,827,622 | 8/1974 | McLoud | 229/17 R X |

*Primary Examiner*—Davis T. Moorhead
*Attorney, Agent, or Firm*—Carpenter & Ostis

[57] ABSTRACT

An easy packing deep container is made from a cut and scored blank of paperboard or the like and comprises opposed pairs of main panels connected along lines of fold to define a tube. One of the main panels is split and is composed of half panel sections part of which are overlapped and joined by gluing or the like. The unjoined parts have scores commencing at the point where they are joined and terminating at corners thereof to define triangular shaped subpanels which may be folded out of the way for loading of the container. Closure flaps extend from one end of the main panels and are foldable to position to define an end closure for the tube. Other closure flaps extend from the opposite edges of the split main panel and are foldably connected thereto to define a pair of minor closure flaps. The triangular shaped subpanels are foldable back into a common plane to complete the loading of the tube, and the other closure flaps are thereafter foldable into overlapping and secured relationship with the other closure flaps after completing of the loading of the tube.

2 Claims, 3 Drawing Figures

EASY PACKING DEEP CONTAINER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to containers adapted to ship bulky material having low density, and which can be shipped in large size containers except for the fact that the loading thereof is not easily accomplished. According to the invention, deep loading is accomplished by providing a front main panel comprised of two half panel sections which are joined along the lower parts thereof, and of other half sections having diagonally extending score lines to define triangular shaped subpanels foldable out of the plane of the front main panel during the loading, such subpanels being thereafter foldable into position together with minor closure flaps extending therefrom. The minor closure flaps cooperate with other closure flaps to complete the closing of the container.

2. The Prior Art

The prior art is best exemplified in the following U.S. Pat. Nos. developed in a search: Belsinger, 2,512,539, June 20, 1950, 229/6; Belsinger, 2,635,802, Apr. 21, 1953, 229/16; Belsinger, 2,648,480, Aug. 11, 1953, 229/7.

The present construction represents an advantage over the prior art since it materially improves the stacking strength of the container. While the prior art discloses containers having vertical and horizontal slits in a main panel thereof, the present construction has only a single vertical opening, thus reducing the weakening effect on the container caused by a plurality of slits.

SUMMARY OF THE INVENTION

The invention is directed to that type of container which is of a depth that the bottom is out of reach of a normal-sized packer. The container is so formed and arranged that the packer has ready access to the inner bottom for the initial loading thereof. Such access is provided by providing a reclosable opening in one of the main panels of the container.

THE DRAWINGS

Figure 2:
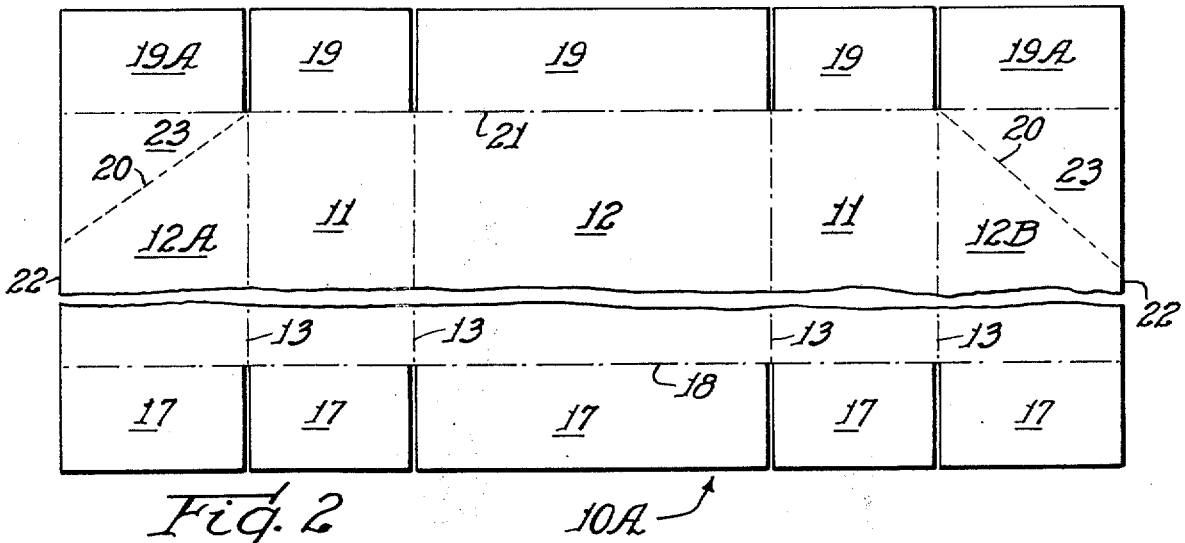
FIG. 2 is a plan view of a cut and scored blank for forming the container of FIG. 1.

The improved container according to the present invention is referred to generally by the reference numeral 10, and is formed from a cut and scored blank 10A. Container 10 comprises opposed pairs of main panels 11, 11, 12, 12A and 12B, these being connected seriatim along fold lines 13. Panels 12A and 12B are glued in overlapping relationship along portions 12C thereof, the remainder of panels 12A and 12B being unglued for reasons as will appear. The aforesaid panels 11, 11, 12, 12A and 12B thus define a container tube. [Closure] *Bottom closure* flaps 17 are foldably connected to the aforesaid main panels along a common fold line 18, and the flaps 17 are foldable into position to define a bottom closure for the tube described.

[Second] *Major top* closure flaps *19* extend from opposite ends of the main panels 11 and 12 and are foldably connected thereto along a common fold line 21.

[Closure] *Minor top closure* flaps 19A extend from panels 12A and 12B and are foldable with respect thereto along the common fold line 21.

A score line 20 is formed in each main panel 12A and 12B and extends from edge 22 thereof to a corner of such main panel at score line 13 connecting same to main panel 11. The score lines 20 thereby define a pair of triangular shaped subpanels 23, 23.

Figure 1:
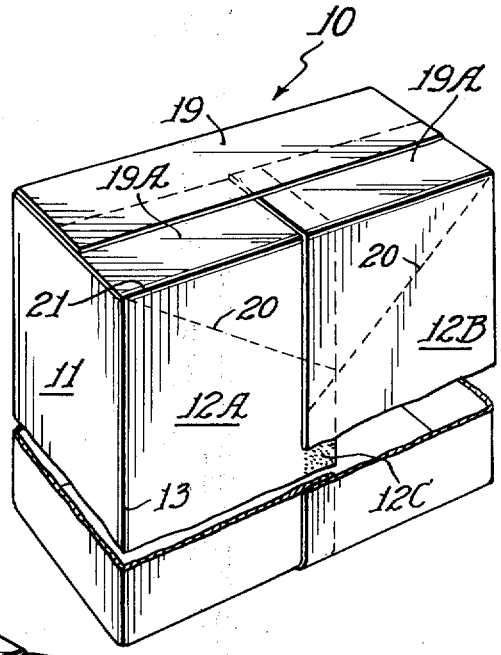
FIG. 1 is an isometric view of a container constructed in accordance with the teachings of the present invention, the container being shown in a position with the closure flaps thereof in closed position.
Figure 3:
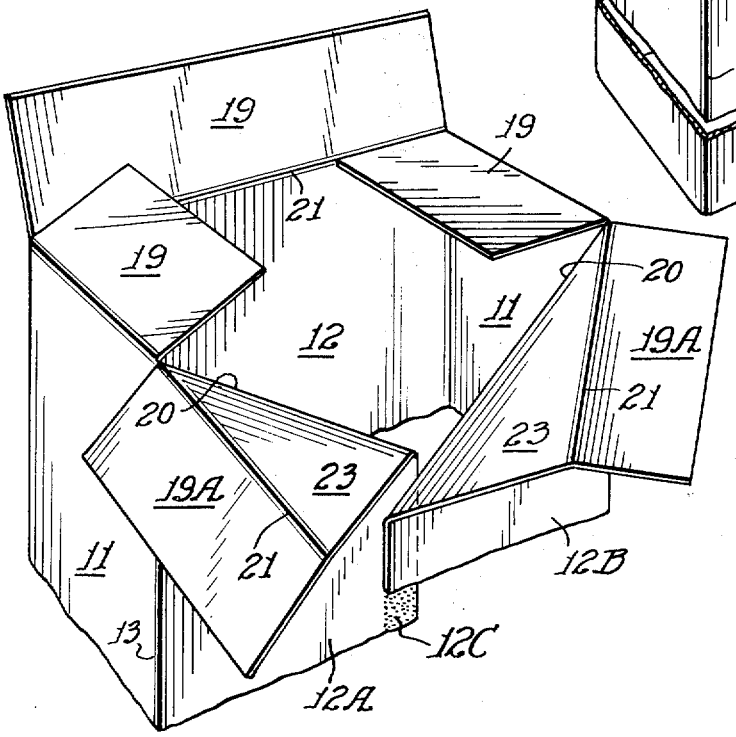
FIG. 3 is a view somewhat similar to FIG. 1, but showing the steps in closing the container after the loading thereof by a packer.

The triangular shaped [panels] *subpanels* 23, 23, together with their connected minor *top* closure flaps 19A, are foldable along the score lines 20 to provide ease of loading of the tube or container body from the open side thereof, as seen particularly in FIG. 3. After the loading of the container 10, the triangular shaped subpanels 23, 23 are folded back into the plane of [their main] panels 12A and 12B, and the loading of the container body is completed. Thereafter, the minor *top* closure flaps [22 and 23] *19A* are folded into side-by-side position, seen in FIG. 1, and the remaining *major top* closure flaps 19 are folded into overlapping and secured relationship as by a suitable adhesive.

We claim:

1. An easy packing deep container made from a cut and scored blank of paperboard or the like comprising:

a. opposed pairs of main panels connected along lines of fold to define a container body;

b. one of said main panels being composed of a pair of overlapping portions secured in overlapping relationship near the edges thereof along part of the length thereof;

c. closure flaps extending from one end of said main panels and foldably connected thereto;

d. said closure flaps being folded with respect to said main panels into overlapping and secured relationship to define a bottom closure for said container body;

e. other [closure] flaps extending from opposite ends of said main panels and foldably connected thereto;

f. a score line extending in said overlapping panel portions from each edge thereof to a corner thereof adjacent one of said other [closure] flaps connected thereto to define a pair of triangular shaped subpanels.

g. said triangular shaped subpanels together with some of said other [closure] flaps being foldable along last named score lines to provide ease of loading of said container body from the open side thereof;

h. said triangular shaped subpanels being foldable back into the plane of said overlapping portions to complete the loading of said container body [;] .

[i. said other closure flaps and the remainder of said other closure flaps being foldable into overlapping and secured relationship after completion of loading of said container body.]

*2. An easy packing deep container made from a cut and scored blank of paperboard or the like comprising:*

*a. opposed pairs of main panels connected along lines of fold to define a container body;*

*b. one of said main panels being composed of a pair of overlapping portions secured in overlapping relationship near the edges thereof along part of the length thereof;*

*c. closure flaps extending from one end of said main panels and foldably connected thereto;*

*d. said closure flaps being folded with respect to said main panels into overlapping and secured relationship to define a bottom closure for said container body;*

*e. a score line extending in said overlapping panel portions from each edge thereof to an upper corner thereof to define a pair of triangular shaped subpanels;*

*f. said triangular shaped subpanels being foldable along last named score lines to provide ease of loading of said container body from the open side thereof;*

*g. said triangular shaped subpanels being foldable back into the plane of said overlapping portions to complete the loading of said container body.*

* * * * *